`United States Patent` [19]

Quermann

[11] 3,854,341

[45] Dec. 17, 1974

[54] MULTIPLE ROTATION GYROSCOPE WITH A SINGLE MOVING ELEMENT

[75] Inventor: Thomas R. Quermann, Huntington Station, N.Y.

[73] Assignee: Sperry Rand Corporation, New York, N.Y.

[22] Filed: May 21, 1973

[21] Appl. No.: 365,871

[52] U.S. Cl. .................................. 74/5.7, 310/112
[51] Int. Cl. ...................... G01c 19/20, G01c 19/08
[58] Field of Search .......... 102/DIG. 3; 74/5, 5.6 D, 74/5.7; 310/112

[56] References Cited
UNITED STATES PATENTS

| | | | |
|---|---|---|---|
| 3,260,122 | 7/1966 | Rocks | 74/5.7 |
| 3,596,523 | 8/1971 | Clark | 74/5.7 |
| 3,722,295 | 3/1973 | Passarelli, Jr. | 74/5 R |
| 3,722,297 | 3/1973 | Duncan et al. | 74/5.7 |

*Primary Examiner*—Manuel A. Antonakas
*Attorney, Agent, or Firm*—Howard P. Terry; Thomas J. Scott

[57] ABSTRACT

A multiple rotation gyroscope including a single moving spherical inertial element is suspended in a low viscosity high density fluid in a state of neutral buoyancy within a cavity of identical shape but of slightly larger diameter having spiral grooves profiled on the internal surface thereof in the region of the axis of high rotation. The cavity is formed within a nongimballed case and the inertial element is rotated at a high speed by a synchronous two pole motor mounted in the fixed case around the equatorial perimeter of the cavity. Secondary slow speed rotation of the element is induced by cruciform eddy current sector motors mounted in the fixed case proximate the polar regions of the case. The motors are excited by voltages from a two phase supply and one of the voltages is carrier suppressed modulated at the high speed spin frequency of the element. The modulation of the excitation voltages applied to the two orthogonal portions of the sector motors from the two phase supply are 90° out of phase to produce a constant magnitude rotating direction drive torque that provides the slow speed rotation of the inertial element.

19 Claims, 7 Drawing Figures

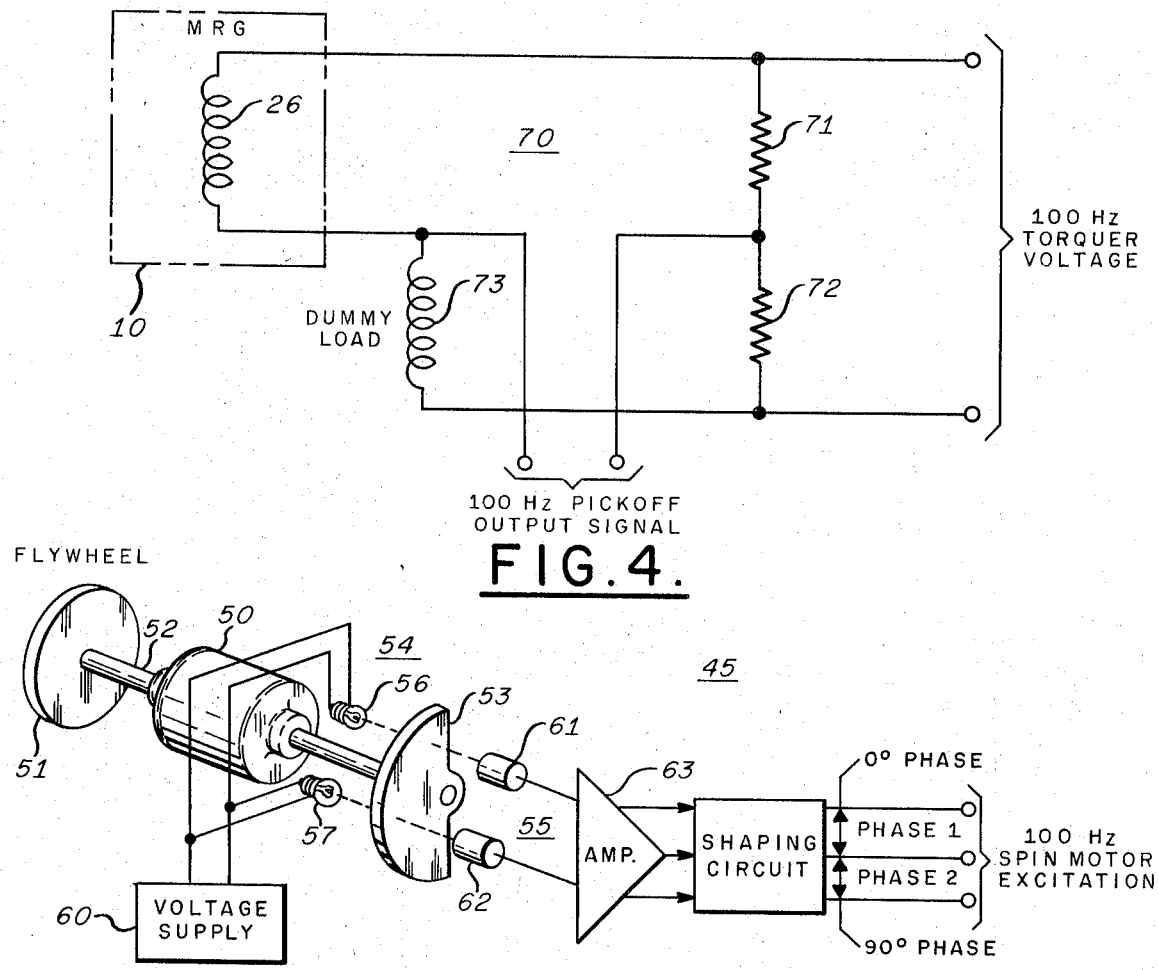
FIG. 4.
FIG. 5.
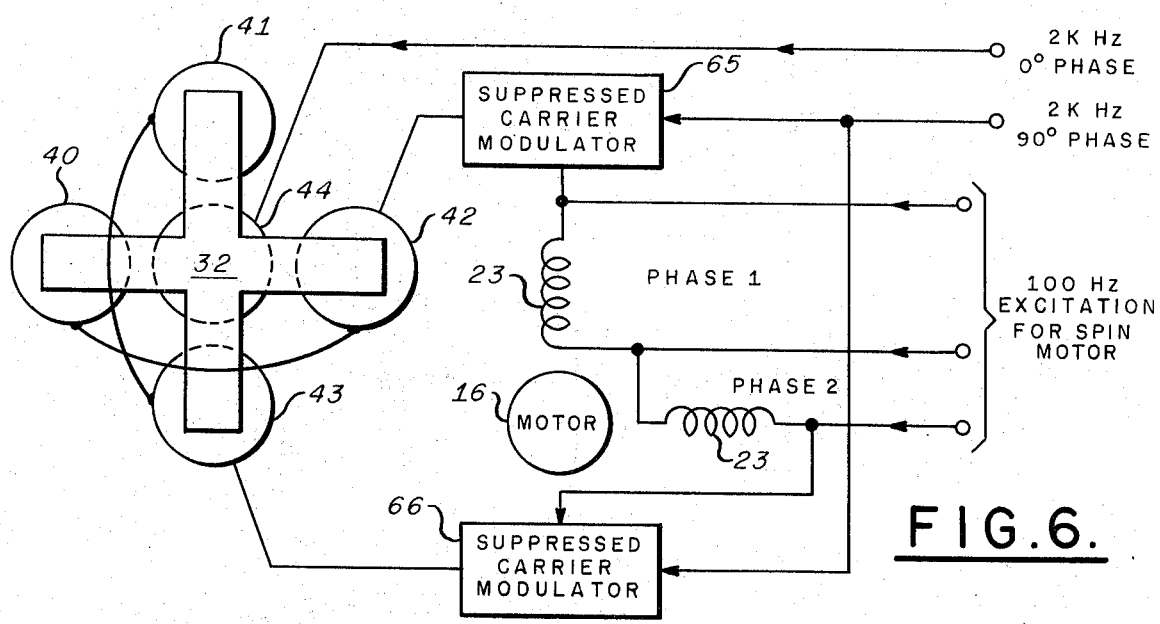
FIG. 6.

MULTIPLE ROTATION GYROSCOPE WITH A SINGLE MOVING ELEMENT

The invention herein described was made in the course of or under a contract or sub-contract thereunder, with the Department of the Air Force.

BACKGROUND OF THE INVENTION

1. Field of the Invention

The present invention pertains to gyroscopic apparatus and especially to such apparatus having an inertial element which is subjected to multiple rotation, for example, gyroscopic apparatus as described in U.S. Pat. No. 3,722,295 entitled "Multiple Rotation Gyroscope With Hydrodynamic Suspension," invented by William O. Passarelli, Jr., filed Dec. 2, 1970 which is an improvement of the co-pending U.S. Pat. application S.N. 392,676 entitled, "Multiple Rotation Gyroscope," invented by Albert D. Graefe, filed Aug. 25, 1964, and now U.S. Pat. No. 3,765,250 both of which are assigned to the assignee of the present invention.

2. Description of the Prior Art

In the prior art multiple rotation gyroscopes the inertial element is driven with simultaneous continuous rotation about two mutually orthogonal axes. The first or high speed axis is fixed with respect to the instrument case and the second or slow speed axis is the axis of minimum inertia of the inertial element. In order to provide the foregoing multiple rotation previous instruments have been built with the inertial element suspended from and driven at a slow speed with respect to an intermediate rotor which was mounted in bearings and rotated at a high rate of speed about an axis perpendicular to the slow speed axis. Pickoff, torquer, slow speed drive excitation, preamplifier signals and any element position monitoring signals has to be coupled across the interface between the fixed case and the rapidly spinning rotor by means of slip rings or rotary transformers. Spurious signals caused by imperfections in the bearings carrying the high speed rotor tended to degrade the performance of the prior art multiple rotation gyroscopes. These bearings also contributed to limiting the life of the prior art apparatus and its resistance to environmental extremes.

The invention described herein completely eliminates all problems associated with the intermediate rotor and its supporting elements by eliminating the need for the intermediate rotor. Further, this design does not require any power dissipating elements to be mounted on the inertial element itself. Thus, it also eliminates the requirement for slip rings and rotary transformers.

The inherent simplicity of the resulting design provides a significant reduction in manufacturing cost while simultaneously increasing the life and reliability of the instrument.

SUMMARY OF THE INVENTION

A multiple rotation gyroscope in which a spherical inertial element is suspended in a low viscosity, high density fluid in a state of neutral buoyancy within a cavity having an identical shape but a slightly larger diameter. The internal cavity is formed within the gyroscopic housing or case and the inertial element is the only moving part within the gyroscopic apparatus. Spiral grooves profiled on the internal surface of the cavity function in cooperation with the inertial element and the suspending fluid to provide sufficient forces to resist decentering forces and maintain the inertial element centered within the cavity.

The inertial element is comprised of a high density material such as a dumbbell shaped magnet disposed within a hollow low density metal sphere and is rotated at a high rate of speed by a synchronous two-pole motor mounted in the gyroscopic housing around the equatorial perimeter of the cavity.

A pair of cruciform eddy current sector motors mounted in the gyroscopic housing in the vicinity of the polar regions of the inertial element produce slow speed rotation of the inertial element about an axis perpendicular to the axis of high speed rotation.

Three voltages generated from a two-phase supply are applied to five coils wound on corresponding projecting poles in the sector motors. The first voltage is a constant amplitude voltage which is applied to a coil positioned at the crossover of the cruciform-shaped motor. The second voltage which is applied to the pair of coils located at the extremities of the horizontal members of the cruciform-shaped motors is carrier suppressed, modulated at the high speed spin frequency of the element and phase displaced 90 electrical degrees from the voltage applied to the coil located at the center of the motor. The third voltage which is applied to the pair of coils located at the extremities of the vertical member of the cruciform-shaped motor is also carrier suppressed, modulated at the high speed spin frequency of the element but the modulation is displaced 90 electrical degrees from the modulation of the voltage applied to the pair of coils on the horizontal members. The modulated excitation voltages which are applied to the pair of orthogonally displaced coils produce a constant magnitude rotating direction drive torque that provides the slow speed rotation of the inertial element about an axis perpendicular to the axis of high speed rotation.

A pickoff-torguing coil located in a recess in the laminations of the synchronous two-pole motor detects changes in flux linking the coil and the magnetic poles in the inertial element. The coil produces an output signal proportional to the rate of change in the linking flux. Torquing signals are produced in the coil by an alternating current synchronized with the high speed drive frequency in response to the sensed displacements of the inertial element. The torquing signal is decoupled from the pickoff signal and is phased to apply torques to the inertial element about the desired axis.

BRIEF DESCRIPTION OF THE DRAWINGS

FIG. 4 is a schematic diagram of a bridge circuit employed in torquing and sensing displacement of the inertial element;

FIG. 5 is a schematic diagram of a variable frequency two phase supply which may be used with the present invention; and FIG. 6 is a schematic diagram of a drive circuit including modulators for providing suppressed carrier modulated signals to the eddy-current sector motors.

DESCRIPTION OF THE PREFERRED EMBODIMENT

Figure 1:
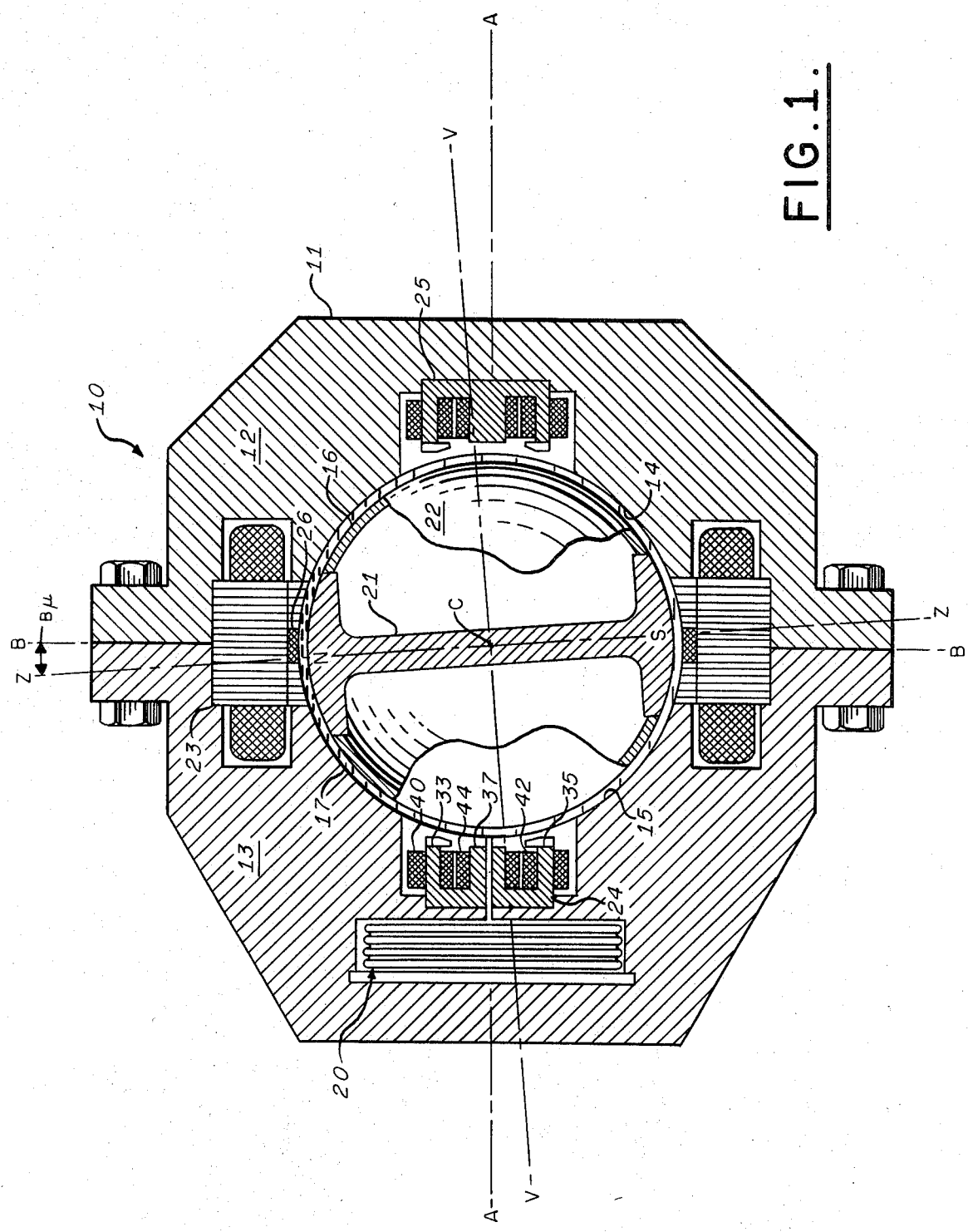
FIG. 1 is a cross-section diagram of a multiple rotation gyroscope including an inertial element suspended in a state of neutral buoyancy which incorporates the invention.

The subject invention will be described with respect to FIG. 1 which shows a multiple rotation gyroscope 10 including a case 11 having a righthand section 12 and a lefthand section 13. A hemispherical depression 14 in the righthand section 12 and a hemispherical depression 15 in the lefthand section 13 form an internal cavity within the case 11 when the righthand portion 12 is joined to the lefthand portion 13. A spherical shaped inertial element 16 is disposed within the cavity and maintained in a state of neutral buoyancy by a low viscosity high density fluid 17. A sealed bellows 20 mounted in the lefthand section 13 maintains the cavity completely filled with the fluid 17 over a wide range of temperatures despite large differences in internal coefficient of volumetric expansion between the fluid 17, the housing 11 and the inertial element 16. The fluid 17 may be a liquid consisting of a fluorocarbon such as FC 75.

The inertial element 16 is rotated about a high speed axis A by a 2-pole motor stator 23 energized from a variable frequency two phase power supply 45 which will be described with reference to FIG. 5, and about a slow speed axis B by eddy current sector motors 24 and 25 energized from a two phase power supply at a fixed frequency. Upon starting the gyroscope 10, rotation of the inertial element 16 about the axis A and about the axis B results in the inertial element 16 having a motion in its steady state condition in inertial space consisting of a fast angular velocity component about an axis V and a slow angular velocity component about its axis of symmetry Z wherein the axis of symmetry Z of the inertial element 16 is disposed at a slight leaning angle $B_u$ from the axis B. The axis V of the inertial element 16 is perpendicular to the axis of symmetry Z. The leaning angle $B_u$ is a function of the fast and slow angular velocity magnitudes and the ratio of the moments of inertia of the inertial element 16 and is a known predictable angle which remains constant in the steady state condition of the multiple gyroscope 10 as taught in the co-pending application S.N. 392,676.

A drum wound coil 26 is mounted in a recess in the laminated iron pole pieces of motor stator 23 to detect the plane of rotation of the inertial element 16 and to provide a means for applying electromagnetic torques which precess the inertial element 16.

Figures 2A, 2B:
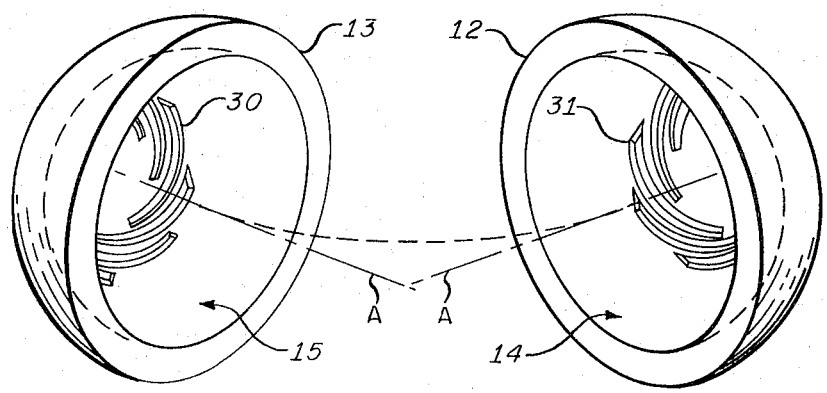
FIG. 2a is a diagram of the lefthand side of an internal cavity within the gyroscope containing profiled spiral grooves on its internal surface.
FIG. 2b is a diagram of the righthand side of the internal cavity also containing profiled spiral grooves on its internal surface.

A hemispherical depression 15 is formed in the lefthand portion 13 of the case 11 as shown in FIG. 2a and spiral grooves 30 are profiled on the internal surface of the depression 15 proximate the polar regions of the inertial element 16 along the A axis.

A second hemispherical depression 14 is formed in the righthand portion 12 of the case 11 as shown in FIG. 2b and spiral grooves 31 are profiled on the internal surface thereof proximate the opposite polar regions of the inertial element 16 along the A axis. When the right and lefthand portions 12 and 13 of the case 11 are joined together they form an internal cavity in which the grooves 30 and 31 function as additional bearing surfaces for producing sufficient hydrodynamic stiffness parallel to the A axis to provide forces which tend to center the inertial element 16 with the cavity.

The variable frequency two phase power supply 45 shown in FIG. 5 includes a motor 50 having a flywheel 51 attached to a shaft 52 for opposing and moderating any fluctuations of speed in the motor 50. Also coupled to the shaft 52 at the end opposite the flywheel is a shutter 53 having a substantially semicircular shape as shown in FIG. 5. The shutter 53 is disposed between a light source 54 and a light responsive device 55. The light source 54 includes light bulbs 56 and 57 displaced 90° from each other and a voltage supply 60 coupled to the bulbs 56 and 57 for providing power thereto. The light responsive device 55 includes a pair of photodetector diodes 61 and 62 aligned with the bulbs 56 and 57 respectively and an amplifier 63. A shaping circuit 64 is coupled to the amplifier 63 for providing a two phase output voltage signal with one phase substantially corresponding to a sine function and the other phase substantially corresponding to a cosine function.

The motor accelerating from rest produces a frequency which varies from 0 to 100 Hz and the runup time can be readily controlled by matching the motor drive torque with the inertia of the flywheel 51.

Figure 3:
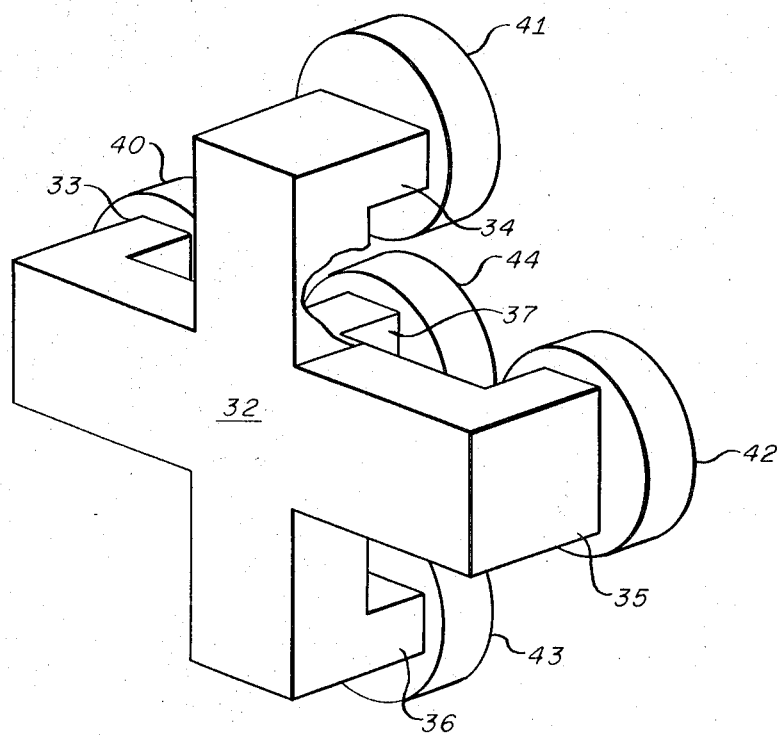
FIG. 3 is a diagram of a cruciformed ferrite core having projecting poles with coils wound thereon which produces slow speed rotation of the inertial element.

The pair of eddy current sector motors 24 and 25 are identical and will be described with reference to FIG. 3 which shows a cruciform ferrite core 32 having five projecting pole pieces 33-37 around which are wound five corresponding coils 40-44. The sector motors 24 and 25 provide a secondary drive which rotates the inertial element 16 at a slow rate of speed about the axis B. The sector motors 24 and 25 are driven from a two-phase supply as shown in FIG. 6 which is external to the multiple rotating gyroscope 10. The carrier frequency of the two-phase supply is selected to produce a maximum torquing efficiency. In one embodiment of the invention, using a metal sphere 22 fabricated of beryllium, the highest torque to power ratio (maximum torquing efficiency) was produced with a carrier frequency of approximately 2 KHz.

As shown in FIG. 6 the center coil 44 is energized by a 2 KHz voltage which is at a fixed amplitude while the coils 40, 41, 42 and 43 are energized by amplitude modulated voltages in which the carrier frequency is suppressed. The carrier frequency of the energizing voltage applied to the horizontally disposed pair of coils 40, 42 is shifted 90 electrical degrees from the carrier frequency of the energizing voltage applied to the center coil 44 due to the 90° phase shift in the 2 KHz voltage applied to the modulator 65. Additionally, the modulation of the carrier frequency of the energizing voltage applied to the vertically disposed pair of coils 41 and 43 is displaced 90 electrical degrees from the modulation of the energizing voltage applied to the coils 40 and 42 due to the 90° phase shift in the 100 Hz voltage applied to the modulator 66.

For example, if the positive end, N, of the magnet 21 along the axis Z lies in the quadrant between coils 42 and 41, the phase of the carrier frequency applied to coils 40, 42 and 41, 43 may be shifted plus 90° with respect to the phase of the carrier frequency excitation applied to coil 44. As the element 16 rotates about the axis A, the axis Z of the inertial element 16 will move to a position where the positive end, N of the magnet 21 will lie between the coils 41 and 40. At this time the phase of the carrier of the voltage applied to coils 40, 42 will be plus 90° with respect to the carrier frequency voltage applied to the coil 44 and the phase of the carrier of the voltage applied to the coils 41, 43 will be minus 90° with respect to the carrier frequency voltage applied to the coil 44. This phase change of the carrier is accomplished by the suppressed carrier modulation of the secondary drive voltages at the high speed drive frequency, i.e., 100 Hz.

As shown in FIG. 6 modulator 65 provides the suppressed carrier modulation of the 90° phase shifted 2 KHz signal applied to coils 40 and 42 by phase 1 of the excitation applied to spin motor 23 and modulator 66 provides the modulation of the 90° phase shifted 2 KHz signal applied to coils 41 and 43 by phase 2 (90° phase shifted) of the excitation applied to spin motor 23. As a result the secondary drive voltages will be phase locked to the inertial element since the synchronous spin motor drive voltages are used to control the modulation of the secondary drive voltages. The modulation of the drive voltages and the orientation of the spin motor 23 and sector motors 24, 25 are arranged so that the forces exerted on the inertial element 16 by the sector motors 24, 25 will be nominally perpendicular to the slow speed axis B at all times. The force produced by sector motor 24 will be opposite in direction to that produced by sector motor 25 to produce a couple about axis B.

The pickoff-torquing coil 26 detects the displacement of the angular momentum vector of the inertial element 16 from the slow spin axis B by producing an output signal proportional to the rate of change of flux linking the pickoff-torquing coil 26.

The frequency of the pickoff signal will be the high speed spin frequency 100 Hz and the phase will depend upon the direction of the displacement of the angular momentum vector from the high speed axis A. Since the spin motor 23 is a two-phase motor, the displacement signal produced by the pickoff-torquing coil 26 can be resolved into two orthogonal components by demodulating the signal with respect to the two phases of the spin motor supply. If the spin motor 23 is a three phase motor then the required two phases could be obtained from a conventional Scott-T transformer in a manner well known in the art.

Torquing of the inertial element 16 is produced by energizing the coil 26 with alternating current synchronized to the frequency of the high speed driving voltage applied to the spin motor 23 and having a phase shift with respect to the frequency of the high speed driving voltage that will produce torque about the desired axis. The torquing signal produced in the pickoff-torquing coil 26 is decoupled from the pickoff output signal by summing an equal and opposite signal into the output. This may be accomplished by a bridge circuit 70 as shown in FIG. 4. One phase of the phase shifted 100 Hz signal from the two phase variable frequency power supply shown in FIG. 5 is applied across the resistors 71, 72 which are connected in parallel with the pickoff-torquing coil 26 and the dummy load coil 73. The applied signal provides the required torquing signal to the element 16 through the coil 26. Displacement of the axis Z of the magnet 21 from alignment with the fixed axis B produces a change in the flux linking the magnet 21 and the coil 26 which induces an emf in the coil 26. A resultant displacement signal is produced across the pickoff terminals of the bridge 70 in accordance with the magnitude of the angular momentum vector and an axis perpendicular to the plane of the coil.

In operation, the variable frequency driving voltage is applied to the two pole motor 23 which causes the spherical element 16 to begin rotating about the axis A at an initial slow rate of speed. The acceleration control means which varies the frequency from rest, i.e., 0 Hz, of the motor 50 in the power supply 45 gradually increases the frequency of the drive voltage until the inertial element 16 is rotating at a predetermined high rate of speed about the A axis. A typical value for the high rate of speed is 100 Hz which is a compromise between power consumption, angular momentum and signal carrier frequency. The increase in the rate of speed is sufficiently slow so that the permanent magnetic poles, designated N and S in FIG. 1, of the inertial element 16 remain synchronized with the rotating magnetic poles in the two-pole motor 23 at all times.

The fluid pressures developed by the hydrodynamic action of the rotating element 16, the fluid 17 and the spiral grooves 30, 31 on the internal surface of the cavity will center the inertial element 16 within the cavity. The function of the spiral grooves 30, 31 herein are distinct from those disclosed in U.S. Pat. No. 3,722,295 because the grooves 30, 31 are located in the region of the cavity adjacent the high speed axis A, whereas in U.S. Pat. No. 3,722,295 they are located in the region of the cavity adjacent the slow speed axis B. Further the surface of element 16 adjacent the grooves 30, 31 is continuously being changed by the secondary rotation therefore grooving profiled on the element 16 would not be feasible. The multiple rotation gyroscope 10 disclosed herein is a combination of fast and slow rotation of the element 16 with respect to the cavity within the fixed case 11 whereas the prior teaching in U.S. Pat. No. 3,722,295 discloses centering an element undergoing rotation about a single axis with respect to a spinning cavity.

The secondary drive sector motors 24 and 25 are driven by the voltages produced by the two-phase supply having a carrier frequency of approximately 2 KHz. The secondary drive sector motors 24 and 25 produce a slow rotation, for example, 1 Hz (60 rpm), of the inertial element 16 about the axis Z. The pickoff-torquing coil 26 embedded in the recesses of the laminations of the two-pole spin motor 23 detects the rate of change of any displacement of the magnet 21 of the inertial element 16 from the B axis which is perpendicular to the coil 26. The displacement may occur with respect to the high speed spin axis A or an axis perpendicular to the slow speed axis B and the high speed spin axis A, i.e., perpendicular to the plane of the drawing in FIG. 1 and designated C. Displacements of the inertial element 16 with respect to either of these two axes, A or B, produce a rate of change in the flux linking the magnetic poles N, S and the pickoff-torquing coil 26 which will produce a proportional output signal from the pickoff-torquing coil 26. When the signal is produced by rotation of the inertial element 16 about an axis V displaced from the high speed spin axis A which is not perpendicular to the plane of the coil 26, the induced signal will have the same frequency as the high speed rotation of the inertial element 16 and a phase which is dependent upon the direction of the displacement of the axis V from the axis A.

By simply demodulating the output signal from the pickoff-torquing coil 26 with respect to the two phases of the voltages applied to the spin motor 23 the output signal from the pickoff-torquing coil 26 can be resolved into two orthogonal components which is a standard convenience.

The source of the torquing current in the coil 26 depends upon the application employed. For open loop torquing, the torquing signal would come from the spin motor excitation with one phase being used for one axis torque and the other phase being used for an orthogonal axis torque. In closed loop operation, the pickoff signal appearing at the output terminals of the bridge 70 as shown in FIG. 6, which are connected to the junction of the resistors 71 and 72 and the junction of the coils 26 and 73 respectively, would be amplified, phase shifted if necessary, and applied as the torquer signal across the resistors 71 and 72. Demodulation of the torquing current for closed loop operation would be used to provide rate output signals. Obviously the sources of these torquing signals require no synchronization because they are derived from the 100 Hz excitation voltages applied to the spin motor 23. However, these torquer signals may require some phase correction which would be accomplished in a conventional manner by networks known in the art.

The multiple rotation gyroscope 10 will operate in accordance with the principles of operation of a multiple rotation gyroscope such as disclosed in the above-referenced co-pending U.S. application S.N. 392,676 and the description of operation described therein is hereby incorporated by reference into the subject application in so far as it is applicable.

While the invention has been described in its preferred embodiment, it is to be understood that the words which have been used are words of description rather than limitation and that changes may be made within the purview of the appended claims without departing from the true scope and spirit of the invention.

I claim:

1. A multiple rotation gyroscopic apparatus comprising
first power source means,
second power source means,
an inertial element having first and second mutually perpendicular axes of inertial symmetry, said inertial element having a moment of inertia about said first axis which is greater than its moment of inertia about said second axis,
gimbal less housing means including an internal cavity enclosing said inertial element,
fluid means contained within said cavity for suspending said inertial element in neutral buoyancy,
first motor drive means coupled to said first power source means and disposed in said housing means external to said cavity around the equatorial perimeter of said cavity for rotating said inertial element about said first axis at a high rate of speed,
second motor means coupled to said second power source means and disposed in said housing means external to said cavity and substantially aligned along said first axes of said inertial element for rotating said inertial element about said second axis at a lower rate of speed than about said first axis, and
pickoff-torquer means cooperative with said inertial element, disposed in said housing means external to said cavity and substantially aligned along said second axis for sensing angular displacements of said inertial element with respect to predetermined axes and producing coercive torques which are applied to said inertial element with respect to said predetermined axes.

2. A gyroscopic apparatus as recited in claim 1 in which said first power source means includes a source of electrical power having a variable carrier frequency for rotating said inertial element at different rates of speed.

3. A gyroscopic apparatus as recited in claim 2 in which said first power source means further includes control means for varying the frequency of said power supply whereby said inertial element is rotated at an initial slow speed and its speed is gradually increased until it attains said high rate of speed.

4. A gyroscopic apparatus as recited in claim 3 in which said control means includes means for gradually increasing said carrier frequency from an initial value of 0 Hz to said high rate of speed.

5. A gyroscopic apparatus as recited in claim 1 in which said first power source means includes a source of two phase electrical power.

6. A gyroscopic apparatus as recited in claim 5 in which said first power source means includes a two phase supply in which said second phase is displaced 90 electrical degrees from said first phase.

7. A gyroscopic apparatus as recited in claim 6 in which said first power source means includes a motor having a rotating shaft with a substantially semicircular-shaped shutter mounted on one end thereof, said shutter being disposed between a pair of light sources positioned 90° with respect to each other and a pair of photo detectors aligned with respect to said light sources.

8. A gyroscopic apparatus as recited in claim 7 in which said first power source means further includes a series combination of amplifier means and shaping circuit means coupled to said photo detectors for providing a two phase output power signal in which said second phase is 90 electrical degrees displaced with respect to aid first phase.

9. A gyroscopic apparatus as recited in claim 7 in which said first power source means further includes a flywheel mounted on the end of said shaft opposite said shutter for opposing and moderating any change in speed of said rotating shaft.

10. A gyroscopic apparatus as recited in claim 1 in which said first motor drive means includes a two pole spin motor having coils wound around a plurality of laminations.

11. A gyroscopic apparatus as recited in claim 10 in which said pickoff-torquer means includes a drum wound coil mounted in a recess in said plurality of laminations.

12. A gyroscopic apparatus as recited in claim 11 in which said pickoff-torquer means includes means for decoupling signals in accordance with said sensed angular displacements from signals which produce said coercive torques.

13. A gyroscopic apparatus as recited in claim 12 in which said pickoff-torquing means further includes a bridge circuit for decoupling said sensed displacement signals from said signals for producing coercive torques.

14. A gyroscopic apparatus as recited in claim 13 in which said bridge circuit includes a parallel circuit comprised of a resistive branch including a pair of resistors connected in series and an inductive branch including said drum wound coil connected in series to a dummy coil and sensed displacement signals are produced between the junctions of said resistors and said coils.

15. A gyroscopic apparatus as recited in claim 1 in which said second power source means includes a two phase power supply in which the second phase is displaced 90 electrical degrees from the first phase.

16. A gyroscopic apparatus as recited in claim 1 in which said second motor drive means includes a pair of sector motors oppositely disposed along said first axis.

17. A gyroscopic apparatus as recited in claim 16 in which each of said sector motors includes a cruciform ferrite core having a coil wound on each of five projecting poles located at each extremity of said core, a first pair of coils comprising coils disposed at each horizontal extremity, a second pair of coils comprising coils disposed at each vertical extremity and a fifth coil located at the center of said cruciform core.

18. A gyroscopic apparatus as recited in claim 17 in which said second motor drive means further includes first modulator means having first and second inputs coupled to said first and second power sources respectively for producing a suppressed carrier modulated signal which is applied to said first pair of coils disposed at each horizontal extremity of said cruciform core, and second modulator means having first and second inputs coupled to said first and second power source means respectively for producing suppressed carrier modulated signals which are applied to said second pair of coils disposed at each vertical extremity of said cruciform core.

19. A gyroscopic apparatus as recited in claim 18 in which said center coil on said cruciform core is responsive to a first fixed amplitude alternating drive voltage at zero degrees electrical phase shift, said first pair of coils are responsive to a second alternating drive voltage of like frequency phase shifted 90 electrical degrees from said first drive voltage and suppressed carrier modulated in synchronism with said high speed rotation of said inertial element, and said second pair of coils are responsive to a third alternating drive voltage of like frequency phase shifted 90 electrical degrees from said first drive voltage and suppressed carrier modulated in synchronism with said high speed rotation of said inertial element and said modulation of said third drive voltage is phase shifted 90 electrical degrees from said modulation of said second drive voltage.

* * * * *